United States Patent

Bergerhoff et al.

(10) Patent No.: US 6,701,230 B2
(45) Date of Patent: Mar. 2, 2004

(54) METHOD AND SYSTEM FOR MONITORING THE WHEELS OF A VEHICLE

(75) Inventors: Nikolas Bergerhoff, Regensburg (DE); Martin Fischer, Regensberg (DE)

(73) Assignee: Siemens Aktiengesellschaft, Munich (DE)

(*) Notice: Subject to any disclaimer, the term of this patent is extended or adjusted under 35 U.S.C. 154(b) by 14 days.

(21) Appl. No.: 10/279,462

(22) Filed: Oct. 24, 2002

(65) Prior Publication Data

US 2003/0093197 A1 May 15, 2003

(30) Foreign Application Priority Data

Oct. 24, 2001 (DE) .......................... 101 52 335

(51) Int. Cl.⁷ ................................ B06T 8/00
(52) U.S. Cl. ...................... 701/29; 701/90; 701/74; 303/122; 303/122.06; 73/146.4; 340/422
(58) Field of Search .................. 701/74, 75, 90, 701/92, 29, 31; 303/122.06, 122, 133, 173, 139, 154; 180/170, 197; 700/304; 73/146.3, 146.4, 146.5; 340/442, 445

(56) References Cited

U.S. PATENT DOCUMENTS 4,013,324 A * 3/1977 Quon ................. 303/122.06

FOREIGN PATENT DOCUMENTS

| DE | 42 05 911 A1 | 9/1993 | .......... B60C/23/04 |
|---|---|---|---|
| DE | 196 31 784 C2 | 2/1999 | .......... B60C/23/04 |
| DE | 197 20 123 C2 | 3/2001 | .......... H02J/13/00 |
| DE | 100 14 076 A1 | 10/2001 | .......... B60C/23/02 |
| EP | 0 806 307 B1 | 5/1997 | .......... B60C/23/04 |
| JP | 11078445 A | 3/1999 | .......... B60C/23/02 |

* cited by examiner

Primary Examiner—William A. Cuchlinski, Jr.
Assistant Examiner—Arthur D. Donnelly
(74) Attorney, Agent, or Firm—Baker Botts L.L.P.

(57) ABSTRACT

A method for monitoring the wheels (R1, R2, R3, R4) of a motor vehicle (10) for fault states, in particular for incorrect tire pressures, comprises the steps of: each wheel (E1, E2, E3, E4) to be monitored is assigned a wheel unit (E1, E2, E3, E4) which transmits data (D1, D2, D3, D4) to a central evaluation device (ECU) of the vehicle (10) at least in response to a trigger signal, the occurrence of a fault state and the wheel position (FL, FR, RL, RR) of the wheel (R1, R2, R3, R4) at which the fault state has occurred being indicated. The detection and the indication of the wheel position (FL, FR, RL, RR) of the wheel (R1, R2, R3, R4) at which the fault state has occurred can be triggered after the fault state has been indicated.

26 Claims, 2 Drawing Sheets

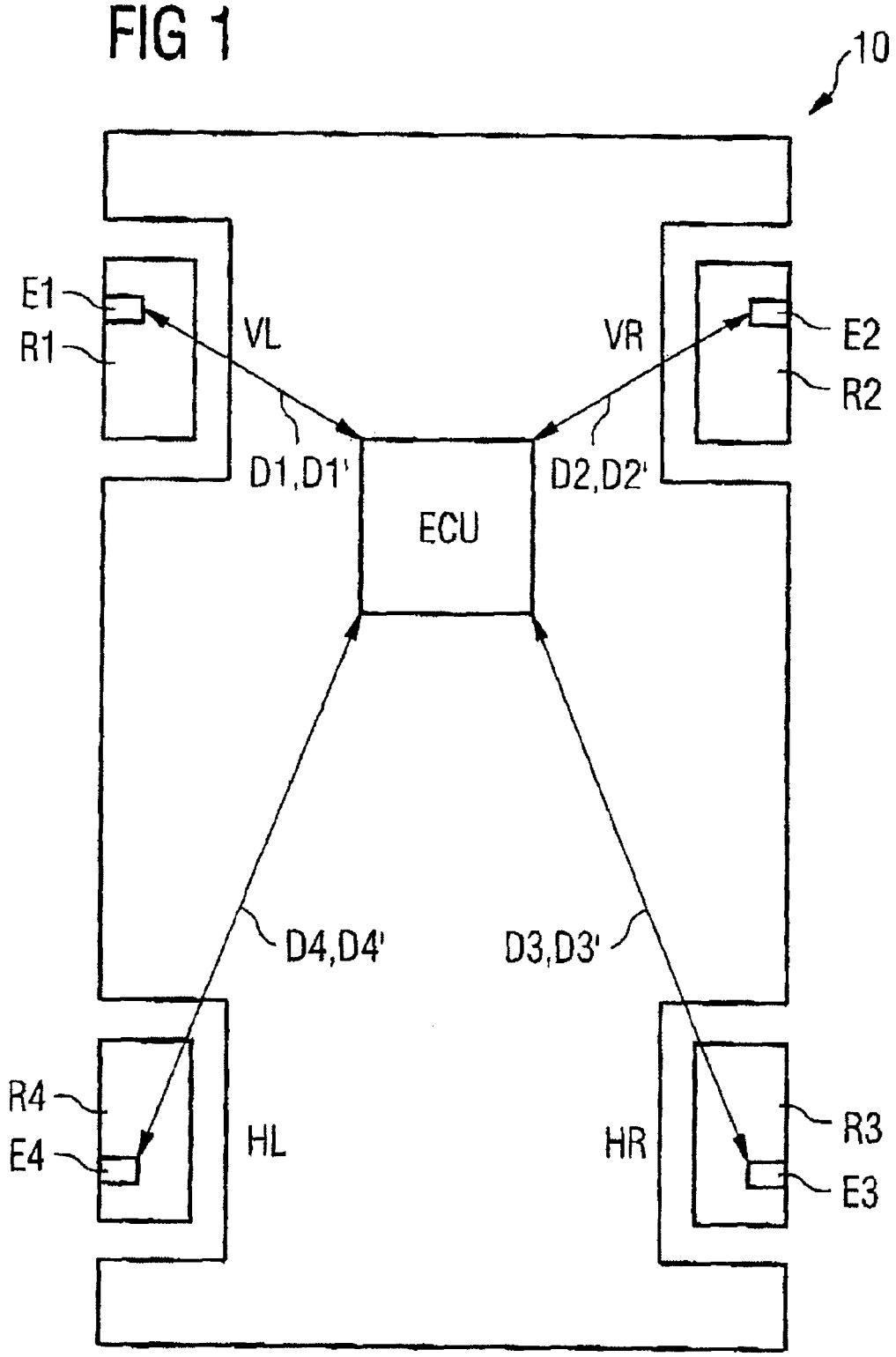

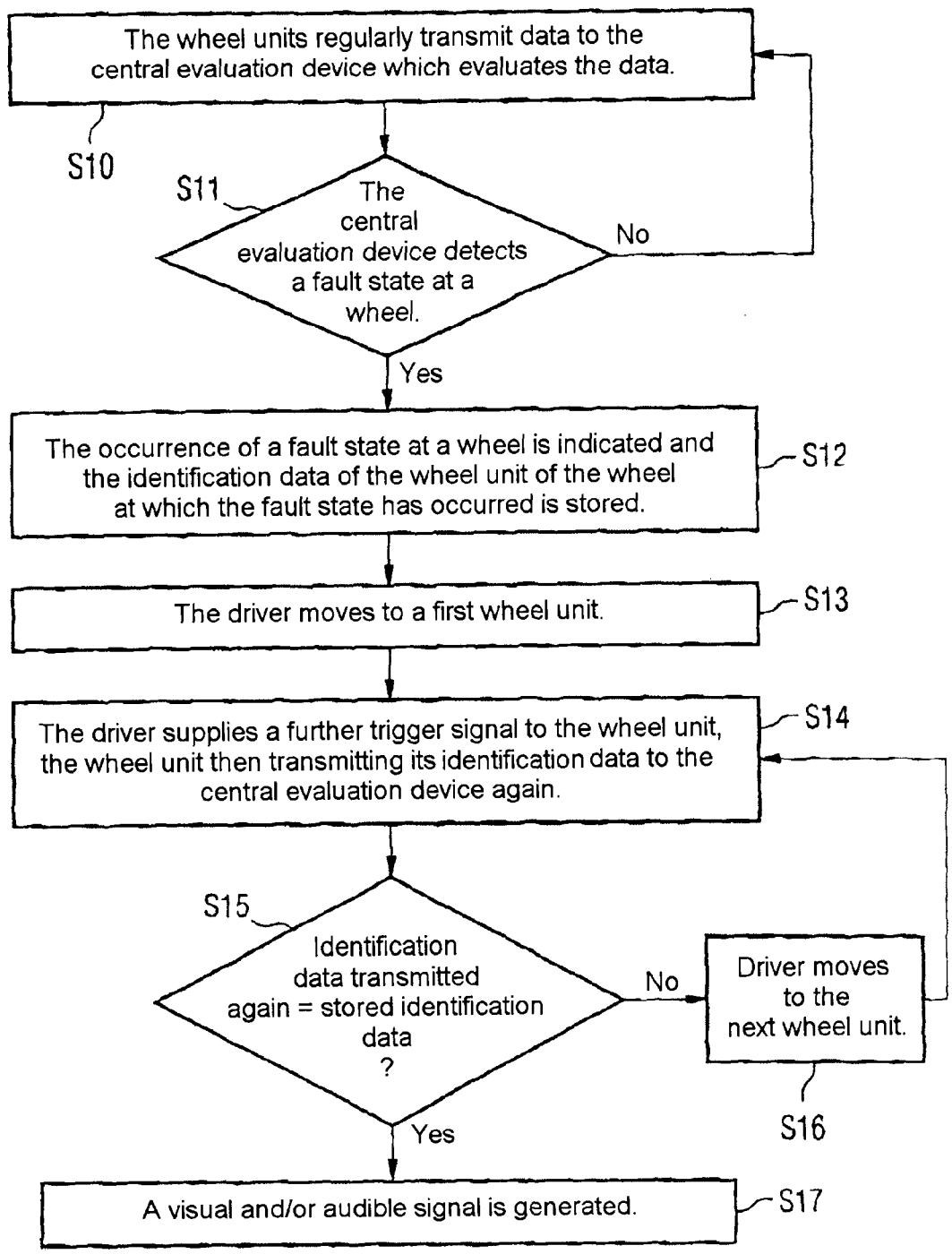

METHOD AND SYSTEM FOR MONITORING THE WHEELS OF A VEHICLE

BACKGROUND OF THE INVENTION

The invention relates to a method for monitoring the wheels of a motor vehicle for fault states, in particular for incorrect tire pressures, in which each wheel to be monitored is assigned a wheel unit which transmits data to a central evaluation device of the vehicle at least in response to a trigger signal, the occurrence of a fault state and the wheel position of the wheel at which the fault state has occurred being indicated. In addition, the invention relates to a system for monitoring the wheels of a motor vehicle for fault states, in particular for incorrect tire pressures, having a plurality of wheel units and having a central evaluation device, each wheel to be monitored being assigned a wheel unit which transmits data to a central evaluation device of the vehicle at least in response to a trigger signal, and the occurrence of a fault state and the wheel position of the wheel at which the fault state has occurred being indicated.

The term fault state is to be interpreted loosely in the present context and comprises all states which are considered to be worthy of detection.

With respect to the methods of the generic type and the systems of the generic type it is known, for example, that the wheel units transmit information to a central evaluation device, arranged on the chassis of the motor vehicle, by means of radio frequency signals. In the present context, wheel units are to be understood as any unit which rotates with a respective wheel and is suitable for supplying information or data by means of which fault states which possibly occur at the wheel can be detected. In addition to the actual detection of a fault state, it is necessary to determine at least the wheel position (for example front left, front right, rear left, rear right) of a wheel at which a fault state has occurred. For this purpose, in the known methods and systems the wheel position of all the wheels is detected and stored so that, for example, a central evaluation device already knows which data transmitted for detecting a fault state is assigned to which wheel position. For example, EP 0 806 307 B1 has already disclosed a method for carrying out the assignment of the wheel position to air pressure monitoring devices in an air pressure monitoring system of a motor vehicle, the motor vehicle having, inter alia, the following components: a number of wheels, each wheel being assigned an air pressure monitoring device which is capable of transmitting an individual identifier to a central processor unit, and a central processor unit in which the assignment of the identifier to an air pressure monitoring device relating to the wheel position for each wheel is stored. In the method known from EP 0 806 307 B1, the assignment of the air pressure monitoring device to the wheel position is performed as follows: an assignment mode is switched on; the individual identifiers of the air pressure monitoring device are output; the central processor unit evaluates which individual identifier has been transmitted from which wheel position; the assignment which is detected in the central processor unit is stored; and the assignment mode is switched off and the air pressure monitoring system is operated in a pressure monitoring mode. In order to evaluate the individual identifiers, there is, in particular, provision here for a specific variable, for example the wheel speed, for each wheel of the motor vehicle to be measured both with a wheel unit of the air pressure monitoring device and with a fixed sensor with a known wheel position. Then, the wheel position of the individual wheels is determined by comparing the output signals of the fixed sensors and the output signals of the wheel units. DE 197 20 123 C2 also discloses that a separate antenna is to be provided in the region of each wheel to be monitored, which antenna can be used to receive signals emitted by the wheel units. Although each of the antennas can, under certain circumstances, also receive signals from wheel units which are not arranged directly adjacent to the respective antenna, according to the teaching of DE 197 20 123 C2 it is sufficient, for determining the wheel position of the individual wheels, to assume that a signal which is emitted and received by a directly adjacent wheel unit has a higher signal level than a signal which is received by a more remotely arranged wheel unit. The known systems and methods have in common the fact that they are very complex and therefore expensive in terms of the hardware and software necessary to determine the wheel positions.

SUMMARY OF THE INVENTION

The invention is based on the object of developing the methods of the generic type and the systems of the generic type in such a way that at least the wheel position of a wheel at which a fault state has occurred can be determined with a relatively small amount of expenditure on hardware and software.

This object is achieved by a method for monitoring the wheels of a motor vehicle for fault states, in which each wheel to be monitored is assigned a wheel unit which transmits data to a central evaluation device of the vehicle at least in response to a trigger signal, the occurrence of a fault state and the wheel position of the wheel at which the fault state has occurred being indicated, the detection and the indication of the wheel position of the wheel at which the fault state has occurred being triggered after the fault state has been indicated, wherein the wheel position of the wheel at which the fault state has occurred is detected without all the wheel positions being stored, and said detection comprises a further trigger signal being supplied to at least one wheel unit at a known wheel position.

The detection of the wheel position of the wheel at which the fault state has occurred can be triggered manually. The further trigger signal can be supplied to the at least one wheel unit at the known wheel position by the valve of the corresponding wheel being touched. The further trigger signal can be supplied to the at least one wheel unit at the known wheel position by a portable transmitter being activated in the vicinity of the corresponding wheel. The portable transmitter may be formed by the remote control of a vehicle locking system. The further trigger signal may further be supplied to the at least one wheel unit at the known wheel position by a magnet being moved into the vicinity of the corresponding wheel. The further trigger signal may be supplied to the at least one wheel unit at the known wheel position by an inductive field being generated in the vicinity of the corresponding wheel. The wheel unit can transmit further data to the central evaluation device in response to the further trigger signal, in that the central evaluation device compares the further data with stored data in order to determine whether the further data originates from the wheel unit which is assigned to the wheel at which the fault state has occurred, and in that the wheel position is indicated if it is determined that the further data originates from the wheel unit which is assigned to the wheel at which the fault state has occurred. Each wheel unit may store when it transmits to the central evaluation device data which allows a fault state to be determined, and in that the at least one wheel unit triggers, at a known wheel position, the indication of the wheel position in response to the further trigger signal if it has transmitted to the central evaluation device data which allows a fault state to be determined. The wheel position can be indicated by generating an audible and/or a visual signal. The wheel position can also be indicated by actuating one or more indicator lights and/or one or more headlights and/or one or more tail lights and/or the horn of the motor vehicle. The data, and if appropriate the further data, can be transmitted to the central evaluation device from the wheel units via a radio link. The fault state can be a state for incorrect tire pressures.

An embodiment of the present invention ca be a system for monitoring the wheels of a motor vehicle for fault states having a plurality of wheel units and having a central evaluation device, each wheel to be monitored being assigned a wheel unit which transmits data to a central evaluation device of the vehicle at least in response to a trigger signal, the occurrence of a fault state and the wheel position of the wheel at which the fault state has occurred being indicated, and the detection and the indication of the wheel position of the wheel at which the fault state has occurred being triggered after the fault state has been indicated, wherein it has trigger means which, when activated, cause a further trigger signal to be supplied to at least one wheel at a known wheel position in order to detect, without storing all the wheel positions, the wheel position of the wheel at which the fault state has occurred.

The system can have activation means by means of which the detection of the wheel position of the wheel at which the fault state has occurred can be triggered manually. The trigger means can be formed in the region of a valve of a corresponding wheel, and in that the trigger means are activated by touch. The trigger means may also be formed by a portable transmitter which is activated in the vicinity of the corresponding wheel in order to supply the further trigger signal. The portable transmitter can be formed by a remote control of a vehicle locking system. The trigger means may be formed by a magnet which, having been moved into the vicinity of the corresponding wheel supplies of the further trigger signal. The trigger means can generate an inductive field in order to supply the further trigger signal. The wheel unit can transmit further data to the central evaluation device in response to the further trigger signal, in that the central evaluation device compares the further data with stored data in order to determine whether the further data originates from the wheel unit which is assigned to the wheel at which the fault state has occurred, and in that it indicates the wheel position if it is determined that the further data originates from the wheel unit which is assigned to the wheel at which the fault state has occurred. Each wheel unit may store when it transmits to the central evaluation device data which allows a fault state to be determined, and in that the at least one wheel unit triggers, at a known wheel position, the indication of the wheel position in response to the further trigger signal if it has transmitted to the central evaluation device data which allows a fault state to be determined. The system may have audible and/or visual signaling means for indicating the wheel position. The signaling means can comprise one or more indicator lights and/or one or more headlights and/or one or more tail lights and/or the horn of the motor vehicle. The data, and if appropriate the further data, can be transmitted to the central evaluation device from the wheel units via a radio link. The fault state can be a state for incorrect tire pressures.

The method according to the invention is based on the prior art of the generic type in that the detection and the indication of the wheel position of the wheel at which the wheel state has occurred is triggered after the fault state has been indicated. As a result of this solution, the wheel position of a wheel has to be determined only very rarely, specifically only after a fault state has occurred. In the method explained at the beginning, it is, in contrast, always necessary for the wheel position of all the wheels to be determined if in the meantime a wheel change was possible. As a result of the solution according to the invention, it is also no longer necessary to store the wheel positions of all the wheels.

In one particularly preferred development of the method according to the invention there is provision for the detection of the wheel position of the wheel at which the fault state has occurred to be triggered manually. Here, in particular embodiments are considered in which the detection of the wheel position of the wheel at which the fault state has occurred is triggered manually only if the vehicle has stopped, that is to say at a time at which there is no longer pronounced danger.

In particular in the context explained above, the method according to the invention can also provide for the detection of the wheel position of the wheel at which the fault state has occurred to comprise a further trigger signal being supplied to at least one wheel unit at a known wheel position.

For this purpose, the method according to the invention can provide for the further trigger signal to be supplied to the at least one wheel unit at the known wheel position by the valve of the corresponding wheel being touched. The touching of the valve can be detected here by means of impedance measurements, for example.

The method according to the invention can alternatively provide for the further trigger signal to be supplied to the at least one wheel unit at the known wheel position by a portable transmitter being activated in the vicinity of the corresponding wheel. The two solutions explained above have in common the fact that a further trigger signal can be supplied in succession to a wheel unit until the wheel or the wheel position at which the fault state has occurred is detected.

If a portable transmitter is used to generate the further trigger signal, the method according to the invention provides, in an advantageous refinement, for the portable transmitter to be formed by the remote control of a vehicle locking system. Here, the further trigger signal can correspond to the signal provided on a standard basis by the remote control of the motor vehicle locking system, or the remote control can have additional pushbutton keys which are provided specifically for generating the further trigger signal.

As an alternative to touching the wheels or using a portable transmitter, the method according to the invention can provide for the further trigger signal to be supplied to the at least one wheel unit at the known wheel position by a magnet being moved into the vicinity of the corresponding wheel. Such a magnet can be both a permanent magnet and a electromagnet.

Alternatively, the method according to the invention can also provide for the further trigger signal to be supplied to the at least one wheel unit at the known wheel position by an inductive field being generated in the vicinity of the corresponding wheel. In specific embodiments it can be generally advantageous if the further trigger signal is generated in the same way or similar way to a trigger signal which is transmitted, for example, to the wheel unit from a central evaluation device in order to request data.

In particularly preferred embodiments of the method according to the invention there is provision for the wheel unit to transmit further data to the central evaluation device in response to the further trigger signal, for the central evaluation device to compare the further data with stored data in order to determine whether the further data originates from the wheel unit which is assigned to the wheel at which the fault state has occurred, and for the wheel position to be indicated if it is determined that the further data originates from the wheel unit which is assigned to the wheel at which the fault state has occurred. The further data here can, in particular, comprise identifiers which are uniquely assigned to the respective wheel units. In this case, the stored data also comprises the respective identifiers of the wheel units.

The method according to the invention can advantageously also provide for each wheel unit to store when it transmits to the central evaluation device data which allows a fault state to be determined, and for the at least one wheel unit to trigger, at a known wheel position, the indication of the wheel position in response to the further trigger signal if it has transmitted to the central evaluation device data which allows a fault state to be determined. With this solution, it is in particular possible to dispense with specific identifiers of the wheel units so that identical wheel units can be used for all the wheels. However, said wheel units are preferably successively requested to transmit data.

The method according to the invention also preferably provides for the wheel position to be indicated by generating an audible and/or a visual signal. In this context, in particular binary, audible and/or visual signals are preferred.

In this context, the method according to the invention can, for example, provide for the wheel position to be indicated by actuating one or more indicator lights and/or one or more headlights and/or one or more tail lights and/or the horn of the motor vehicle.

In all the embodiments of the method according to the invention it is preferably provided that the data, and if appropriate the further data, is transmitted to the central evaluation device from the wheel units via a radio link. In particular, radio-frequency radio links are considered here.

Any system which is suitable for carrying out an embodiment of the method according to the invention falls within the scope of protection of the respective claims.

The system according to the invention is based on the generic prior art by virtue of the fact that it triggers the detection and the indication of the wheel position of the wheel at which the fault state has occurred after the fault state has been indicated. As a result, the advantages explained in conjunction with the method according to the invention are obtained in the same or in a similar way, for which reason reference is made to the corresponding explanations in order to avoid repetitions.

The same applies analagously to the following preferred embodiments of the system according to the invention, reference also being made to the corresponding explanations of the advantages which can be achieved by these embodiments in conjunction with the method according to the invention.

With advantageous embodiments of the system according to the invention there is also provision for it to have activation means by means of which the detection of the wheel position of the wheel at which the fault state has occurred can be triggered manually.

Furthermore, embodiments of the system according to the invention are considered advantageous in which there is provision for it to have trigger means which, when activated, cause a further trigger signal to be supplied to at least one wheel unit at a known wheel position in order to detect the wheel position of the wheel at which the fault state has occurred.

In this context it is also possible to provide for the trigger means to be formed in the region of a valve of a corresponding wheel, and for the trigger means to be activated by touch.

Alternatively, with the system according to the invention there can be provision for the trigger means to be formed by a portable transmitter which is activated in the vicinity of the corresponding wheel in order to supply the further trigger signal.

In this case it is preferred for the portable transmitter to be formed by the remote control of a vehicle locking system.

However, it is also possible to consider embodiments of the system according to the invention in which there is provision for the trigger means to be formed by a magnet which, having been moved into the vicinity of the corresponding wheel, supplies the further trigger signal.

Furthermore, the present invention comprises systems in which there is provision for the trigger means to generate an inductive field in order to supply the further trigger signal.

Similarly to the method according to the invention, particularly preferred embodiments of the system according to the invention also provide for the wheel unit to transmit further data to the central evaluation device in response to the further trigger signal, for the central evaluation device to compare the further data with stored data in order to determine whether the further data originates from the wheel unit which is assigned to the wheel at which the fault state has occurred, and for it to indicate the wheel position if it is determined that the further data originates from the wheel unit which is assigned to the wheel at which the fault state has occurred.

Furthermore, in the system according to the invention there can be provision for each wheel unit to store when it transmits to the central evaluation device data which allows a fault state to be determined, and for the at least one wheel unit to trigger, at a known wheel position, the indication of the wheel position in response to the further trigger signal if it has transmitted to the central evaluation device data which allows a fault state to be determined.

In preferred embodiments of the system according to the invention there is provision for it to have audible and/or visual signaling means for indicating the wheel position.

Here, there may be provision, for example, for the signaling means to comprise one or more indicator lights and/or one or more headlights and/or one or more tail lights and/or the horn of the motor vehicle.

Similarly to the method according to the invention, with the system according to the invention there is preferably provision for the data, and if appropriate the further data, to be transmitted to the central evaluation device from the wheel unit via a radio link.

The invention is based on the recognition that the necessary expenditure on hardware and software and/or the necessary computing time can be significantly reduced if at least the wheel position at which a fault state has occurred is determined only after the occurrence of a fault state.

BRIEF DESCRIPTION OF THE DRAWINGS

The invention will now be explained by way of example using preferred embodiments and with reference to the appended drawings, in which:

FIG. 1 shows a schematic block diagram of a motor vehicle which has an embodiment of a system according to the invention; and FIG. 2 shows a flowchart which illustrates an embodiment of the method according to the invention.

DETAILED DESCRIPTION OF THE PREFERRED EMBODIMENTS

FIG. 1 shows a schematic block diagram of a motor vehicle which has an embodiment of a system according to the invention. Here, the entire motor vehicle is provided with the reference 10. The motor vehicle 10 has four wheels R1, R2, R3, R4. Each of the wheels R1, R2, R3, R4 is assigned a wheel unit E1, E2, E3, E4 which can be arranged, for example, in the tire and/or in the region of the valve of the respective wheel R1, R2, R3, R4. The wheel position front left is referred to as FL, the wheel position front right is referred to as FR, the wheel position rear left is referred to as RL and the wheel position rear right is referred to as RR. The system illustrated in FIG. 1 comprises a central evaluation device ECU to which the wheel unit E1, E2, E3, E4 transmits data D1, D2, D3, D4, preferably on request by the central evaluation device ECU. The central evaluation device ECU evaluates the data D1, D2, D3, D4 and thus detects if a fault state, for example an incorrect tire pressure occurs at one of the wheels R1, R2, R3, R4. If a fault state occurs at one of the wheels R1, R2, R3, R4, the central evaluation device ECU firstly merely detects the type of fault state, but not the wheel position to which this fault state is to be assigned. In order to determine the wheel position of the wheel at which the fault state has occurred, it is possible, for example, to provide that, after the driver has stopped the motor vehicle, each of the wheel units E1, E2, E3, E4 is successively supplied with a further trigger signal, for example as a result of the valve of a respective wheel R1, R2, R3, R4 being touched. Each wheel unit E1, E2, E3, E4 which has been supplied with a further trigger signal transmits in response further data D1', D2', D3', D4' to the central evaluation device ECU. The latter compares the further data D1', D2', D3', D4' with the stored data D1, D2, D3, D4 in order to determine the wheel position of the wheel at which the fault state has occurred. As soon as the wheel position FL, FR, RL, RR of the wheel R1, R2, R3, R4 at which the fault state has occurred has been determined, this wheel position FL, FR, RL, RR is indicated in a suitable way. The system illustrated in FIG. 1 can execute the method according to the invention, for example, in the way explained with reference to FIG. 2.

FIG. 2 shows a flowchart which illustrates an embodiment of the method according to the invention, the references used in the following explanation relating to FIG. 1. In step S10, the wheel units E1, E2, E3, E4 regularly transmit data D1, D2, D3, D4 to the central evaluation device ECU which evaluates the data D1, D2, D3, D4. In step S11 it is checked whether the central evaluation device ECU has detected a fault state at one of the wheels R1, R2, R3, R4. If no fault state is detected, the system branches back to step S10. If it is detected in step S11 that the central evaluation device ECU has detected a fault state at one of the wheels R1, R2, R3, R4, the procedure continues with step S12. In step S12, the occurrence of a fault state at a wheel R1, R2, R3, R4 is indicated, for example by means of a visual and/or audible signal. Furthermore, the identification data of the wheel unit E1, E2, E3, E4 of the wheel R1, R2, R3, R4 at which the fault state has occurred is stored. In embodiments in which the wheel units E1, E2, E3, E4 do not emit any identification data, the data which characterizes the fault state and which has been transmitted by the corresponding wheel unit E1, E2, E3, E4 is preferably stored. In step S13, the driver moves to a first wheel unit E1, E2, E3, E4 or to a first wheel R1, R2, R3, R4. In step S14, the driver supplies a further trigger signal to that wheel unit of the wheel units E1, E2, E3, E4 to which he moved in step S13. It will be assumed by way of example that this is the wheel unit E1. The trigger signal can be supplied, for example, by activating a portable transmitter. In response, the wheel unit E1 transmits its identification data D1' again to the central evaluation device ECU. In step S15 it is checked whether the identification data D1' which has been transmitted again to the stored identification data. Within the scope of the present example it will be assumed that the fault state has occurred at the wheel R2. The stored identification data is the identification data of the wheel unit E2. The comparison carried out in step S15 thus firstly reveals that the identification data D1' transmitted again does not correspond to the stored identification data. For this reason, the system branches to step S16 in which the driver moves to the next wheel unit of the wheel units E1, E2, E3, E4. Within the scope of the present example it will be assumed that the driver then moves to the wheel unit E2. Step S14, in which the driver supplies a further trigger signal to the wheel unit E2, is then carried out again. The wheel unit E2 then transmits its identification data D2' to the central evaluation device again. Then, in step S15 it is detected that the identification data D2' which has been transmitted again corresponds to the stored identification data. For this reason, the system continues with step S17 in which a visual and/or audible signal is generated. The visual and/or audible signal thus indicates to the driver that he last supplied a further trigger signal to the wheel unit E2 which is assigned to the wheel R2 at which the fault state has occurred.

The features of the invention which are disclosed in the present description, in the drawings and in the claims can be essential to the implementation of the invention, either individually or in any desired combination.

We claim:

1. A method for monitoring the tire pressure in the wheels of a motor vehicle for fault states, in which a wheel unit is arranged in each wheel whose tire pressure is to be monitored comprising the steps of:
   transmitting tire pressure-data to a central evaluation device within the vehicle at least in response to a trigger signal,
   comparing the tire pressure-data with reference data by the central evaluation device to determine a fault state,
   detecting the wheel position of the wheel at which the fault state has occurred without all the wheel positions being stored, and said detection comprises a further trigger signal being supplied to at least one wheel unit at a known wheel position wherein the occurrence of a fault state and the respective wheel position is displayed, and wherein the determination and the display of the wheel position is only triggered after the determination of a fault state.

2. The method as claimed in claim 1, wherein the detection of the wheel position of the wheel at which the fault state has occurred is triggered manually.

3. The method as claimed in claim 1, wherein the further trigger signal is supplied to the at least one wheel unit at the known wheel position by the valve of the corresponding wheel being touched.

4. The method as claimed in claim 3, wherein the further trigger signal is supplied to the at least one wheel unit at the known wheel position by a portable transmitter being activated in the vicinity of the corresponding wheel.

5. The method as claimed in claim 4, wherein the portable transmitter is formed by the remote control of a vehicle locking system.

6. The method as claimed in claim 3, wherein the further trigger signal is supplied to the at least one wheel unit at the known wheel position by a magnet being moved into the vicinity of the corresponding wheel.

7. The method as claimed in claim 3, wherein the further trigger signal is supplied to the at least one wheel unit at the known wheel position by an inductive field being generated in the vicinity of the corresponding wheel.

8. The method as claimed as claimed in claim 3, wherein the wheel unit transmits further data to the central evaluation device in response to the further trigger signal, in that the central evaluation device compares the further data with stored data in order to determine whether the further data originates from the wheel unit which is assigned to the wheel at which the fault state has occurred, and in that the wheel position is indicated if it is determined that the further data originates from the wheel unit which is assigned to the wheel at which the fault state has occurred.

9. The method as claimed as claimed in claim 3, wherein each wheel unit stores when it transmits to the central evaluation device data which allows a fault state to be determined, and in that the at least one wheel unit triggers, at a known wheel position, the indication of the wheel position in response to the further trigger signal if it has transmitted to the central evaluation device data which allows a fault state to be determined.

10. The method as claimed in claim 1, wherein the wheel position is indicated by generating an audible and/or a visual signal.

11. The method as claimed in claim 10, wherein the wheel position is indicated by actuating one or more indicator lights and/or one or more headlights and/or one or more tail lights and/or the horn of the motor vehicle.

12. The method as claimed in claim 1, wherein the data, and if appropriate the further data, is transmitted to the central evaluation device from the wheel units via a radio link.

13. The method as claimed in claim 1, wherein the fault state is a state for incorrect tire pressures.

14. A system for monitoring the tire pressure in the wheels of a motor vehicle for fault states comprising: a plurality of wheel units for determining the tire pressure, wherein each wheel unit is arranged within a wheel, a central evaluation device, wherein each wheel unit transmits tire-data to the central evaluation device of the vehicle at least in response to a trigger signal, and a signaling means for signaling the occurrence of a fault state and the wheel position of the wheel at which the fault state has occurred, and wherein the detection and the indication of the wheel position of the wheel at which the fault state has occurred being triggered after the fault state has been indicated, further comprising trigger means which, when activated, cause a further trigger signal to be supplied to at least one wheel at a known wheel position in order to detect, without storing all the wheel positions, the wheel position of the wheel at which the fault state has occurred.

15. The system as claimed in claim 14, wherein it has activation means by means of which the detection of the wheel position of the wheel at which the fault state has occurred can be triggered manually.

16. The system as claimed in claim 14, wherein the trigger means are formed in the region of a valve of a corresponding wheel, and in that the trigger means are activated by touch.

17. The system as claimed in claim 16, wherein the trigger means are formed by a portable transmitter which is activated in the vicinity of the corresponding wheel in order to supply the further trigger signal.

18. The system as claimed in claim 17, wherein the portable transmitter is formed by a remote control of a vehicle locking system.

19. The system as claimed in claim 18, wherein the trigger means are formed by a magnet which, having been moved into the vicinity of the corresponding wheel supplies of the further trigger signal.

20. The system as claimed in claim 18, wherein the wheel unit transmits further data to the central evaluation device in response to the further trigger signal, in that the central evaluation device compares the further data with stored data in order to determine whether the further data originates from the wheel unit which is assigned to the wheel at which the fault state has occurred, and in that it indicates the wheel position if it is determined that the further data originates from the wheel unit which is assigned to the wheel at which the fault state has occurred.

21. The system as claimed in claim 18, wherein each wheel unit stores when it transmits to the central evaluation device data which allows a fault state to be determined, and in that the at least one wheel unit triggers, at a known wheel position, the indication of the wheel position in response to the further trigger signal if it has transmitted to the central evaluation device data which allows a fault state to be determined.

22. The system as claimed in claim 14, wherein the trigger means generate an inductive field in order to supply the further trigger signal.

23. The system as claimed in claim 14, wherein it has audible and/or visual signaling means for indicating the wheel position.

24. The system as claimed in claim 23, wherein the signaling means comprise one or more indicator lights and/or one or more headlights and/or one or more tail lights and/or the horn of the motor vehicle.

25. The system as claimed in claim 14, wherein the data, and if appropriate the further data, is transmitted to the central evaluation device from the wheel units via a radio link.

26. The system as claimed in claim 14, wherein the fault state is a state for incorrect tire pressures.

* * * * *

UNITED STATES PATENT AND TRADEMARK OFFICE
CERTIFICATE OF CORRECTION

PATENT NO. : 6,701,230 B2
DATED : March 2, 2004
INVENTOR(S) : Bergerhoff et al.

It is certified that error appears in the above-identified patent and that said Letters Patent is hereby corrected as shown below:

Column 1,
Line 5, please insert the following paragraph:
-- RELATED PATENT APPLICATION
    This application claims priority to German Application No. 101 52 335 filed on October 24, 2001. --

Signed and Sealed this

Twenty-fifth Day of May, 2004

JON W. DUDAS
*Acting Director of the United States Patent and Trademark Office*